US006246323B1

(12) United States Patent
Fischbach

(10) Patent No.: US 6,246,323 B1
(45) Date of Patent: Jun. 12, 2001

(54) METHOD AND SYSTEM FOR TRACKING A VEHICLE

(76) Inventor: Trevor A. Fischbach, 322 N. Fullerton Ave., Montclair, NJ (US) 07042

( * ) Notice: Subject to any disclaimer, the term of this patent is extended or adjusted under 35 U.S.C. 154(b) by 0 days.

(21) Appl. No.: 09/040,974

(22) Filed: Mar. 18, 1998

(51) Int. Cl.$^7$ .................................................. G08B 25/00
(52) U.S. Cl. ................ 340/539; 340/572.8; 340/825.49; 340/989; 340/990
(58) Field of Search .................... 340/539, 989, 340/990, 572.8, 825.49

(56) References Cited

U.S. PATENT DOCUMENTS 5,682,133 * 10/1997 Johnson et al. .................. 340/825.49

* cited by examiner

Primary Examiner—Glen Swann
(74) Attorney, Agent, or Firm—Law Office of Mitchell P. Novick; Benjamin Appelbaum

(57) ABSTRACT

A tagging system for tagging a target vehicle consists of a tracking device, a launching device, a receiving device and a monitor to display the position of the target vehicle. The tracking device includes a tracking chip contained in a pliable carrier, and is stored in and launched from a housing mounted in a pursuit vehicle's grill. The launching device includes a firing pad slidably retained within the housing and spring mounted to the housing rear end. Pad forks in communication with a solenoid retain the firing pad near the housing rear end until two switches in the pursuit vehicle are sequentially activated, whereupon the tracking device emits a tracking signal, the solenoid is activated, releasing pad forks and thereby launching the tracking device towards the target vehicle. The tracking device is in free flight until it impacts ("tags") the surface of the fleeing vehicle, to which it adheres by means of the carrier. The tagged vehicle thus emits a tracking signal which represents the location of the tagged vehicle, which is received by the receiving device and appears as an image on a monitor within the pursuit vehicle. The system can work with a Global Positioning Satellite system or similar navigational or communications satellites. The need to maintain constant visual contact is reduced, and thereby the risk of injury to the public and parties involved in the hot pursuit of a fleeing vehicle.

27 Claims, 5 Drawing Sheets

METHOD AND SYSTEM FOR TRACKING A VEHICLE

FIELD OF THE INVENTION

This invention relates to a method for attaching a tracking device to a target vehicle ("tagging" it) from a distance and monitoring the location of the target vehicle after it has been tagged. The present invention includes a tracking device that when launched will adhere to the target vehicle and emit a tracking signal enabling the monitoring of the tagged target vehicle's location, and a system for tagging a target vehicle.

BACKGROUND OF THE INVENTION

Various law enforcement agencies engage in the pursuit of vehicles. Although the majority of drivers cooperate with law enforcement, on many occasions the drivers refuse to do so, and attempt to escape from authorities. These drivers are often chased by authorities attempting to subdue them at high speeds ("hot pursuit"). Although the reasons for fleeing may vary, most often these hot pursuits involve tracking of vehicles which may have been, for example, used in the commission of a crime, may have been stolen, whose occupants may have been engaged in criminal activity and are fleeing a crime scene, etc. A major problem associated with law enforcement's hot pursuit of fleeing vehicles is the risk of injury to police personnel involved in the chase, risk to the occupants of the fleeing vehicle, and more importantly, the risk of injury to the public because these hot pursuits are occurring on public streets and highways. The newsmedia frequently report about individuals who have been killed or injured when they or a vehicle they were in was struck by either a fleeing vehicle, or by the pursuing law enforcement vehicle.

Numerous law enforcement vehicles may simultaneously be pursuing the same vehicle, and they are informed by radio or similar means of communication of the fleeing vehicle's position by the observations of personnel in a pursuing vehicle. A helicopter or other aircraft may monitor the fleeing vehicle's location in some instances and report the location to pursuit vehicles on the ground. A limitation of visual observation, however, is that the fleeing vehicle may be lost if it gets out of sight of the tracking vehicle, the weather is bad and there is poor visibility, or at night.

One product currently being sold under the trademark of LoJack (registered trademark of LoJack Corporation, Dedham, Mass.) does enable police departments which are equipped with their proprietary tracking computers to monitor the location of a vehicle. A transmitter hidden within a vehicle is activated by a radio signal when the vehicle owner reports the vehicle to the police as being stolen. The transmitter then emits a tracking signal which is monitored. This system is limited to vehicles which have been equipped with the proprietary transmitter. Police pursuing a stolen car without this system, or out of the system's coverage area, must still rely on visual contact.

In view of the foregoing, there is a need to minimize the risk of injury to the public and individuals involved in police pursuits. By reducing the need for constant visual contact between the target vehicle and the pursuit vehicles, this risk can be reduced.

The present invention provides a method and device to "tag" a fleeing or "target" vehicle by attaching a tracking device to it from a distance and then monitor the location of that target vehicle without constant visual contact, thereby minimizing the risk to bystanders and the individuals involved in the pursuit.

BRIEF SUMMARY OF THE INVENTION

It is an object of the present invention to provide a method of "tagging" a target vehicle by attaching a tracking device to it from a distance and then monitor the location of that target vehicle.

It is an object of the present invention to provide an apparatus that will cause the attachment to or tagging of a vehicle with a tracking device, to enable the vehicle to be tracked.

It is another object of the present invention to provide a tracking device that is capable of being attached to or tagging a target vehicle.

It is another object of the present invention to provide a device that will launch a tracking device from a pursuing vehicle.

Still another object of the present invention is to provide a handheld device that will launch a tracking device towards a vehicle.

Still another object of the present invention is to provide a system to tag a vehicle with a tracking device and to track the vehicle tagged with the tracking device.

Yet another object of the present invention is to provide a tracking system whereby the tagged vehicle can be tracked by a plurality of mobile pursuit vehicles.

Still another object of the present invention is to provide a tracking system whereby the tagged vehicle can be tracked by personnel at a base station.

Still another object of the present invention is to provide a means for keeping the tracking device carrier at a temperature suitable for attachment to a vehicle.

The present invention is a method and system for tagging a target vehicle. The method comprises the steps of sighting the target vehicle, launching a tracking device towards the target vehicle, the tracking device having a carrier and a means for tracking, the means for tracking contained within the carrier; attaching the carrier to the target vehicle, the tracking device within the carrier being attached to the target vehicle, thereby tagging the target vehicle; and causing a tracking signal to be emitted from the means for tracking. The tracking signal is then received, converted into an image of the tagged target vehicle, and then displayed on a display means, the image representing the location of the tagged target vehicle.

The tagging system comprises a tracking device, a launching device, a receiving device and a monitor to display the position of the target vehicle. The tracking device comprises a tracking chip contained in a pliable carrier, and is stored in and launched from a housing mounted in a pursuit vehicle's grill. The launching device includes a firing pad slidably retained within the housing and spring mounted to housing rear end. Pad forks in communication with a solenoid retain the firing pad near the housing rear end until two switches in the pursuit vehicle are sequentially activated, whereupon the tracking device emits a tracking signal, the solenoid is activated, releasing pad forks and thereby launching the tracking device towards the target vehicle. The tracking device is in free flight until it impacts ("tags") the surface of the fleeing vehicle, to which it adheres by means of carrier. The tagged vehicle thus emits a tracking signal which represents the location of the tagged vehicle, which is received by the receiving device and appears as an image on a monitor within the pursuit vehicle. The system can work with a Global Positioning Satellite system or similar navigational or communications satellites. The present invention reduces the need to maintain constant visual contact, and thereby the risk of injury to the public and parties involved in the hot pursuit of a fleeing vehicle.

DETAILED DESCRIPTION OF THE INVENTION

Figure 1:
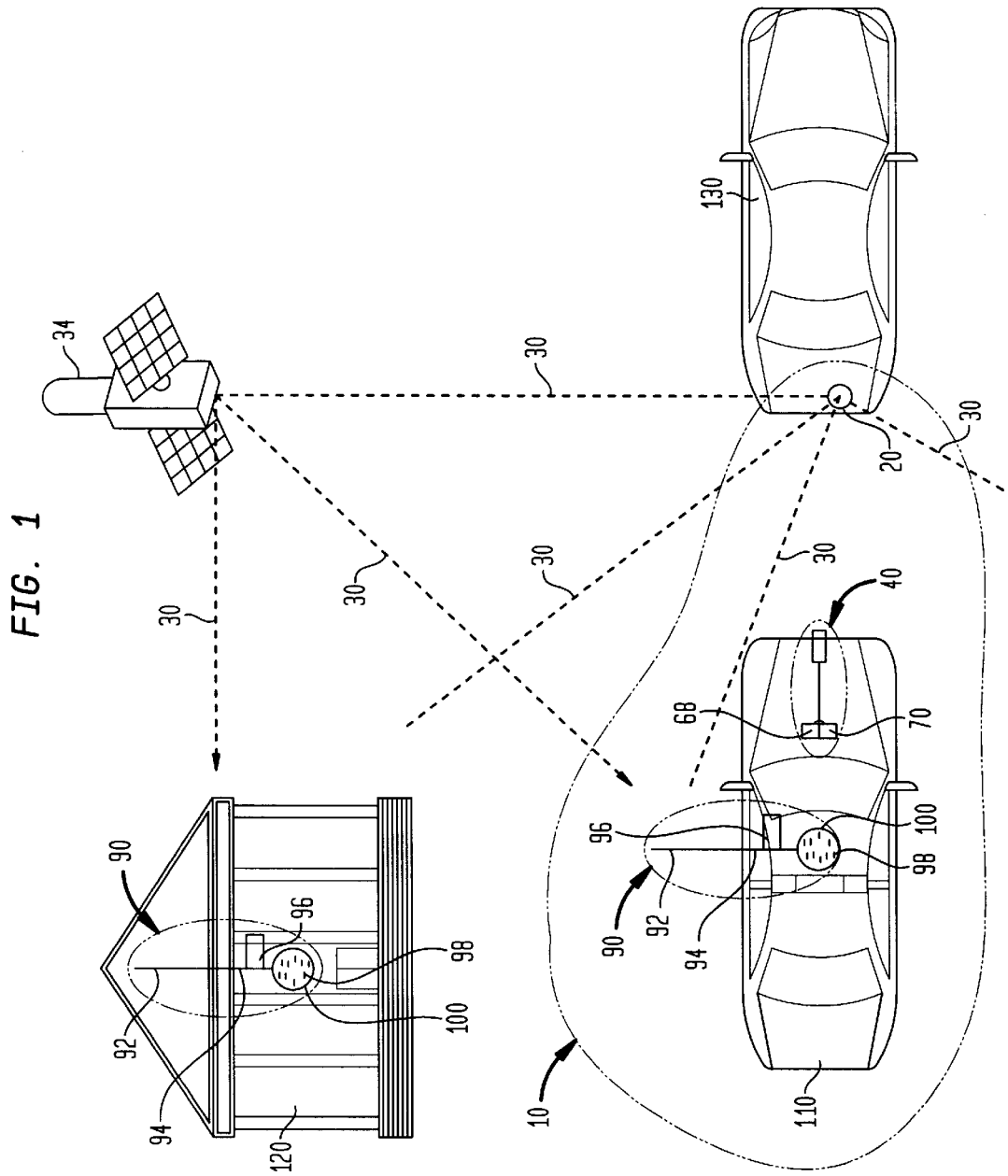
FIG. 1 is a schematic diagram of the tracking system of the present invention.

The present invention is a tagging system 10 as shown in FIG. 1. The system 10 includes a tracking device 20, a launching device 40, receiving device 90 and display 100. A launching device 40, receiving device 90 and display 100 can be mounted in a vehicle 110, such as a police vehicle (also referred to as a pursuit vehicle). Receiving device 90 and display 100 can be positioned at additional mobile sites (other police cars or the like) or at a base station 120 such as a police headquarters. Receiving device 90 and display 100 may also be maintained solely at the base station 120, where personnel can coordinate all pursuit activities. Fleeing vehicle 130 is shown in FIG. 1 after being "tagged" by tracking device 20 launched from pursuit vehicle 110. As shown in FIG. 4, tracking device 20 includes a tracking chip 22 having a microprocessor 24, a battery 26 or similar power source, and a transmitter 28 that emits a trackable signal 30. Tracking device 22 is embedded within a carrier 32. Carrier 32 is a pliable highly sticky mass, which in the preferred embodiment of the present invention has the approximate shape and size of a baseball (FIG. 3).

A monitor 100 or display is used to track the fleeing vehicle 130. The monitor can be a cathode ray tube ("CRT"), a dual scan monitor, thin film transistor, or other type of display known to those skilled in the art. A monitor 100 and receiving device 90 can be mounted in one or more pursuit vehicles 110, such that several pursuit vehicles can track the fleeing and tagged vehicle. Additional monitors and receiving devices at a base station 120, such as the police headquarters, enable other personnel to observe the course of a pursuit, and coordinate operations. The tracking signal can be received and reflected by a global positioning satellite ("GPS") 34 or similar navigational satellite or satellite systems. An antenna 92 receives the tracking signal 30 emitted by tracking chip 22. The received signal is transmitted via standard cables 94 to a receiver 96 which receives the emitted signal 30, and contains instructions which causes the emitted signal to be displayed as an image 98 on the monitor 100. The displayed image 98 thus represents the location, and direction of the fleeing and tagged vehicle.

In the preferred embodiment of the present invention the launching device 40 is mounted in the front grill of a pursuit vehicle (FIG. 1). Mounting brackets 42 (FIG. 3) retain launching device within the grill, but the exact configuration of the mounting brackets will depend upon the particular vehicle in which the launching device 40 is mounted. The location of the launching device 40 and mounting brackets 42 needed to mount launching device 40 in a Chevrolet, for example, may differ from those needed to mount launching device 40 in a Ford product. Launching device 40 can also be fabricated such that it can be a handheld unit fired by an individual policeman, such as an officer on foot patrol.

Figure 2:
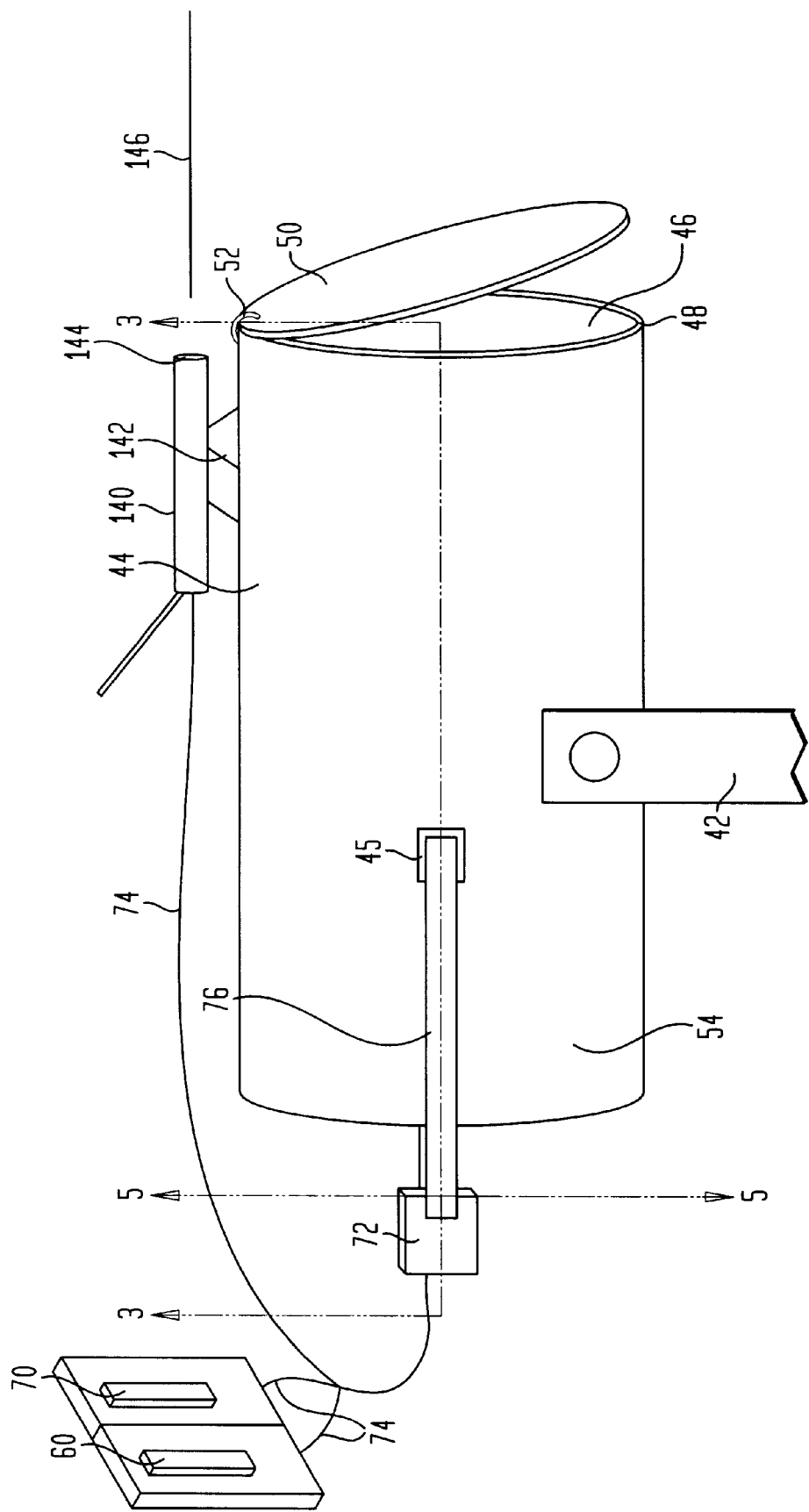
FIG. 2 is a side view of the launcher of the present invention.
Figure 3:
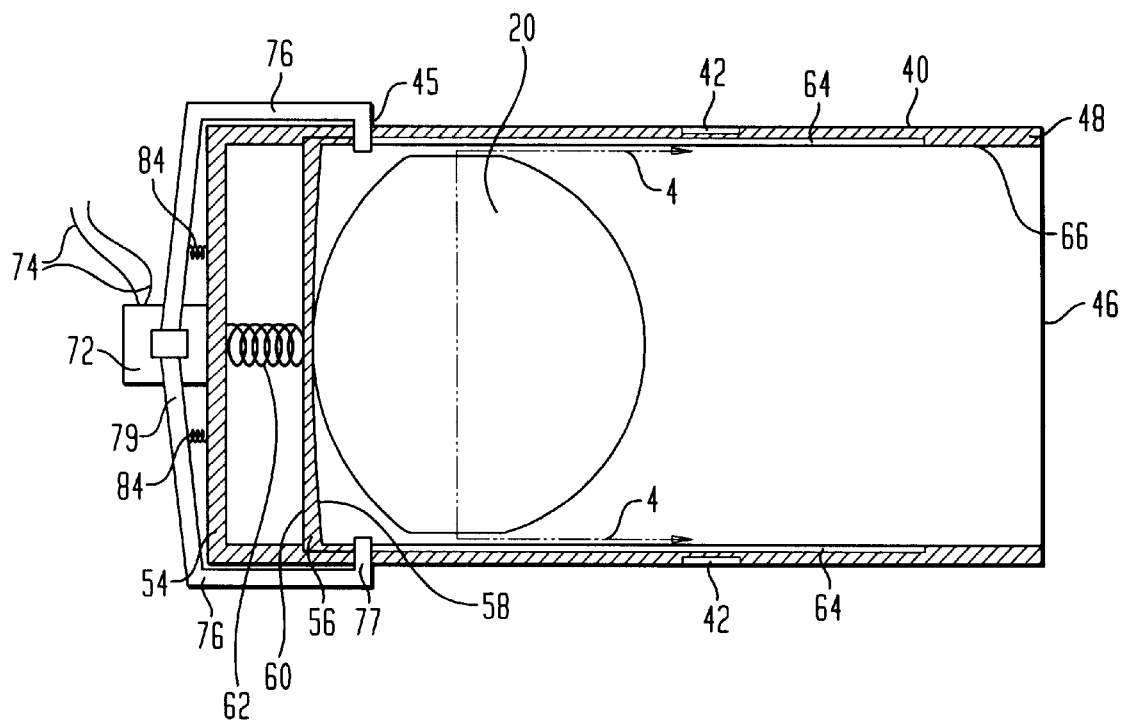
FIG. 3 is a sectional view through the launcher taken along line 3—3 of FIG. 2.
Figure 4:
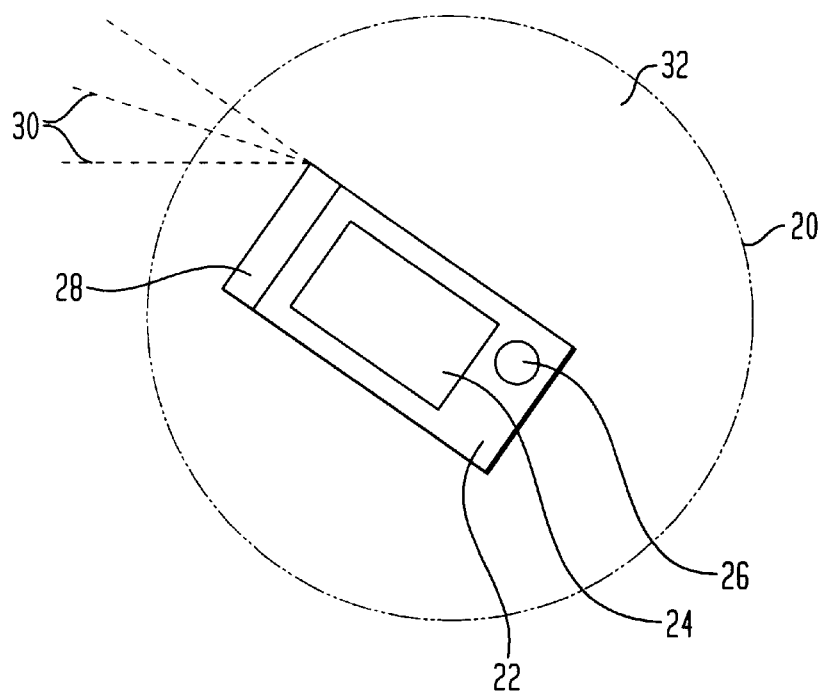
FIG. 4 is a sectional view of the tracking device of the present invention taken along line 4—4 of FIG. 3.

As seen in FIGS. 2 and 3, launching device 40 includes a cylindrical housing 44 with an opening 46 at its front end 48. Housing 44 may also be referred to as cylinder 44. Housing 44 is a Teflon coated, non-stick cylinder which not only securely houses tracking device 20, but serves as a protective housing. Housing 44 also targets tracking device 20 to its destination, launches tracking device 20, and provides a stable environment to ensure accuracy and the best conditions to effect a successful firing of the tracking device and tagging of the fleeing vehicle.

Housing front end 48 is covered by a door 50 which is attached to it by hinge 52 (shown in FIG. 2 with the door open slightly). Door 50 swings out of the way of the tracking device when tracking device 20 has been launched. Door 50 prevents dust, water, or other debris from entering the housing and also prevents sudden temperature changes from occurring within housing 44.

The back end 54 of housing 44 is closed. A firing pad 56 having a front surface 58 and rear surface 60 is slidably retained within housing 44. Firing pad 56 front surface 58 is curved such that its curve is complementary to the curved surface configuration of tracking device 20. This insures good contact between the tracking device and the firing pad for launching of the tracking device. Firing pad 56 is attached to housing back end 54 by firing pad spring 62.

The forward movement of firing pad 56 is limited by grooves 64 within the inside surface 66 of housing 44. Grooves 64 enable firing pad 56 to move freely within housing 44, yet prevent the jamming or spinning of firing pad 56 when launching a tracking device.

Two switches 68 and 70 (See FIG. 2) are situated in tandem inside pursuit vehicle 110. Both switches have to be activated sequentially to prevent a premature or accidental launching of the device. First switch 68 is an arming switch, and second switch 70 is the firing switch. Both switches are connected to firing solenoid 72 by means of wires 74. Once the fleeing vehicle 130 has been sighted and the housing aimed appropriately, the tracking device is launched. When both switches are depressed sequentially, tracking chip 22 is armed and solenoid 72 is activated causing the pad forks 76 to pivot away from firing pad 56. The pad forks have a pronged end 77 and second end 79. Pad fork pronged end 77 enters housing 44 through openings 45 on the side of housing 44, where pronged end engages firing pad 56. Once pad forks are away from firing pad 56, the tension on firing pad spring 62 is released, propelling firing pad 56 forward and launching tracking device 20 through housing opening 46 and into free flight towards the fleeing vehicle 130. Pad forks 76 serve as return and hold down forks which ensure that when firing pad 56 is compressed against spring 62 for firing (the "loaded" position) firing pad 56 stays securely compressed against spring 62 until triggered by actuation of switches 68 and 70.

A pair of return springs 84 mounted between housing rear end 54 and pad forks 76 limit the movement of pad forks 76 such that pad forks 76 will engage firing pad 56 when firing pad 56 is returned to its loaded position at the rear of cylinder 44 for reloading. Firing pad 56 and the inside surface 66 of housing 44 are made of material such that tracking device 20 will not adhere to either surface when tracking device 20 is launched.

Once armed, tracking device 20 starts emitting tracking signal 30. When launched from housing 44, tracking device 20 containing tracking chip 22 travels in a free flight until it impacts with fleeing vehicle 130. There are no strings, poles or grappling hooks connecting tracking device 20 with the pursuit vehicle once tracking device 20 has been launched. The range required to ensure the accuracy of a successful tagging is approximately 50 feet.

Tracking device 20 impacts on the surface of fleeing vehicle 130, carrier 32 adheres to the surface of fleeing vehicle 130 by means of carrier's 32 sticky and adhesive consistency, and the fleeing (or target) vehicle has been "tagged". The consistency of carrier 32 is such that it prevents tracking chip 22 from being damaged when tracking device 20 impacts with and attaches to the target vehicle 130. The tracking signal emitted can then be followed by personnel in the pursuit vehicle 110 or additional sites 120 to monitor the location of the fleeing vehicle. Police personnel can then decide which course of action is appropriate to subdue the fleeing vehicle, without incurring the risks of high speed pursuits which require maintaining constant visual contact with the fleeing vehicle.

The tracking signal 30 emitted from tracking chip 22 is programmed to be unique for each tracking chip. Because each tracking signal serves as a unique representation of the tracking device, the attachment of a tracking device to a target vehicle represents the location of the particular tagged vehicle. If police are pursuing several tagged vehicles, they can monitor the location of several tagged vehicles simultaneously and know which image displayed corresponds to a particular tagged vehicle.

Launching device 40 can be equipped with a laser sighting mechanism 140 to facilitate aiming and targeting of the fleeing vehicle (FIG. 2). Laser sight 140 is attached to housing 40 via attachment means 142, which can be a mounting bracket or similar devices known to those skilled in the art. Laser sight 140 is connected to arming switch 68 by wire 74, and laser sight is activated when arming switch 68 is actuated. Laser sight emits a laser beam 146 from front end 144, marking the vehicle to be tagged with a visible dot. Aiming can be done visually by pointing the pursuit vehicle or the launcher at the target vehicle. The RED EYE (trademark) laser pointer is an example, not meant to be limiting, of such a laser pointing device.

Carrier 32 has to be maintained in a pliable state. Low temperatures cause the material of carrier 32 to solidify, and carrier 32's ability to adhere to a fleeing vehicle is diminished under these conditions. This is not a problem in many environments.

Figure 5:
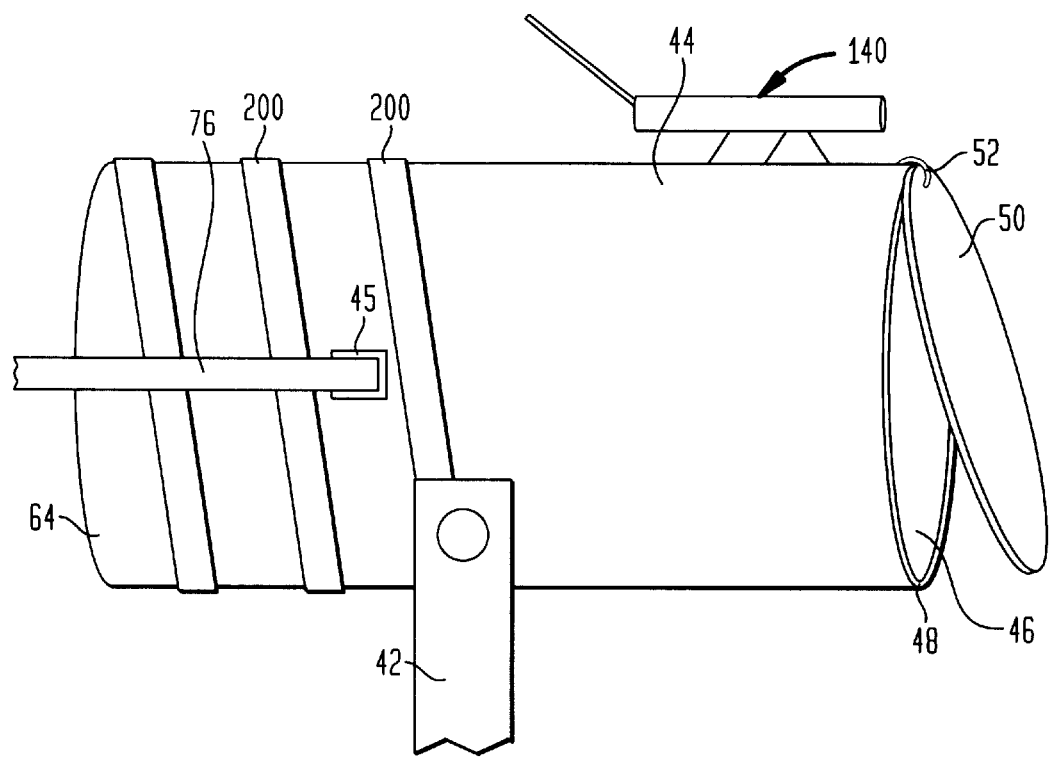
FIG. 5 is a side view of an alternate embodiment of the launching device illustrating the use of heat wrap tape to heat the housing.

In an alternate embodiment of the present invention, the housing 44 is kept warm in order to keep the carrier 32 in a pliable state. This embodiment would be used in areas where the temperature falls below that necessary to keep carrier 32 pliable. As shown in FIG. 5 (which excludes arming and firing switches 68 and 70, respectively, and solenoid 72), cylinder 44 is wrapped with an electric heat wrap tape 200 which is connected to a power source (not shown), such as the alternator of the pursuit vehicle.

Figure 6:
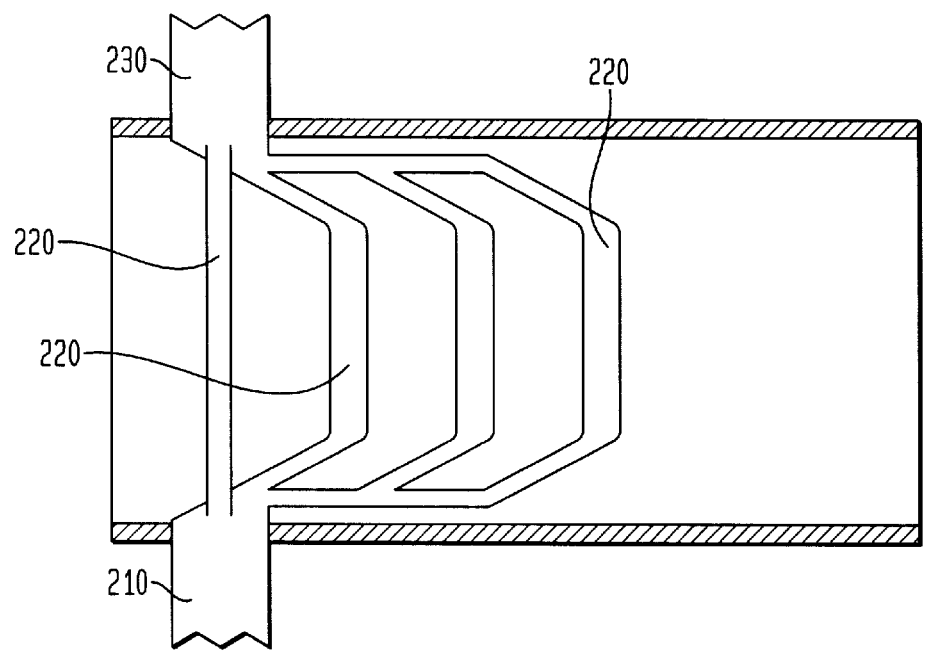
FIG. 6 is a sectional view of another embodiment of the launching device illustrating the use of the pursuit vehicle's cooling system to heat the housing.

In another embodiment of the present invention, cylinder 44 is maintained at a warm temperature by means of the pursuit vehicle's cooling system. As shown in FIG. 6, coolant from the cooling system is directed through fitting 210 into a plurality of channels 220 in cylinder 44 and through fitting 230 from which coolant reconnects to the vehicle's cooling system. The advantage of such a system is that once the vehicle's engine is turned on, carrier 32 is at a proper temperature within minutes.

Figure 7:
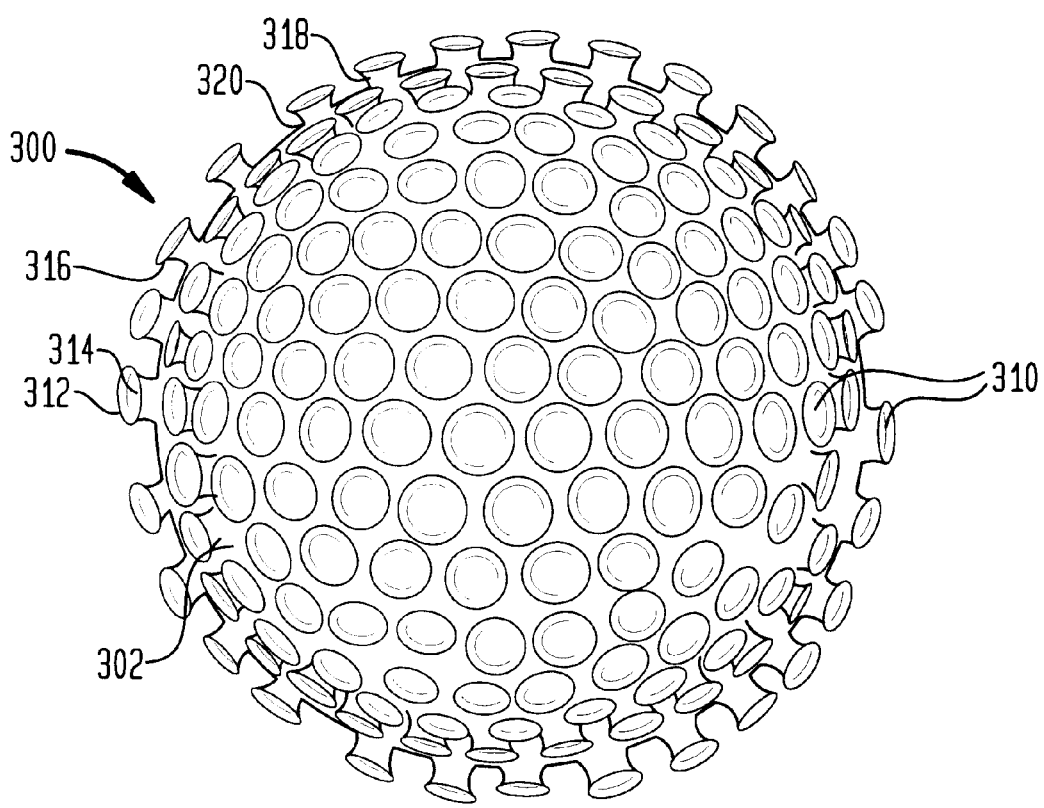
FIG. 7 is a perspective view of an alternate embodiment of the carrier.

In another embodiment, the carrier 300 is ball-shaped as described for the preferred embodiment, but the outer surface 302 has suction cups 310 attached to it (FIG. 7). Each suction cup 310 comprises a flexible cup-shaped body member 312 having an inside cup portion 314 and an outside cup portion 316. Outside cup portion 316 is attached to a neck 318 which in turn is connected to ball outer surface 302 by a base 320. Tracking device 20 is contained within carrier 300, and carrier 300 is launched from housing 44 as previously described. When carrier 300 impacts on the surface of the fleeing vehicle 130, it adheres to the vehicle's surface by one or more of the cup-shaped body members 312, thereby tagging fleeing vehicle 130.

Therefore, although this invention has been described with a certain degree of particularity, it is to be understood that the present disclosure has been made only by way of illustration and that numerous changes in the details of construction and arrangement of parts may be resorted to without departing from the spirit and scope of the invention.

I claim:

1. A method for tagging a target vehicle, the method comprising the steps of:

sighting the target vehicle;

launching a tracking device towards the target vehicle, the tracking device having a carrier and a tracking means for tracking, the tracking means contained within the carrier;

attaching the carrier to the target vehicle, the tracking device within the carrier being attached to the target vehicle, thereby tagging the target vehicle; and causing a tracking signal to be emitted from the tracking means.

2. The method of tagging a target vehicle as described in claim 1, further comprising the steps of receiving the tracking signal emitted by the tracking means, and converting the received tracking signal into an image of the tagged target vehicle.

3. The method of tagging a target vehicle as described in claim 2, further comprising the step of displaying the image on a display means, the image representing the location of the tagged target vehicle.

4. The method for tagging a target vehicle as described in claim 3, wherein said launching step further includes the step of arming the tracking device, such that the tracking means emits the tracking signal prior to being launched towards the target vehicle.

5. The method for tagging a target vehicle as described in claim 4, further comprising the step of receiving the tracking signal by a pursuit vehicle.

6. The method for tagging a target vehicle as described in claim 4, further comprising the step of receiving the tracking signal at a base station.

7. The method for tagging a target vehicle as described in claim 4, wherein the target vehicle is an automobile.

8. The method for tagging a target vehicle as described in claim 1, wherein the emitting step further comprises the step of reflecting the tracking signal emitted by the tracking means from a Global Positioning Satellite ("GPS") to a receiving means.

9. A tagging device for tagging a target vehicle, the tagging device comprising:

A. a tracking chip having
   a microprocessor,
   a power source, and
   an emitting means for emitting a tracking signal, the tracking signal emitted being a unique representation of the tracking chip; and
B. an attachment means for attaching the tracking chip to the target vehicle, the attachment means containing the tracking chip therein, such that when the attachment means attaches to the target vehicle, the tracking chip contained therein is not damaged.

10. The tagging device as described in claim 9, wherein the attachment means is adhesive.

11. The tagging device as described in claim 9, wherein the tracking chip further comprises a receiving means for receiving an arming signal, the arming signal causing the tracking chip to emit the tracking signal.

12. The tagging device as described in claim 9, wherein the attachment means has an outer surface.

13. The tagging device as described in claim 12, wherein the attachment means has a suction cup attached to said outer surface.

14. A system for tagging a target vehicle, the system comprising:
A. a tracking device comprising:
   1. a tracking chip having
      a microprocessor,
      a power source, and
      an emitting means for emitting a tracking signal, the tracking signal emitted being a unique representation of the tracking chip; and
   2. an attachment means for attaching the tracking chip to the target vehicle, the attachment means containing the tracking chip therein, such that when the attachment means attaches to the target vehicle, the tracking chip contained therein is not damaged;
B. a launching device having:
   a housing having a front end having an opening therethrough, and a rear end;
   a launching means for launching slidably retained within the housing;
   a connecting means connecting the launching means to the housing rear end;
   a retaining means for retaining the launching means within the housing and proximate to the housing rear end and the connecting means;
   the tracking device slidably retained within the housing but not adhering to the housing, and the tracking device in contact with the launching means but not adherent to the launching means;
   an actuating means for actuating the launching means, which when activated causes the retaining means to be released, the tracking device to be launched towards the target vehicle and the tracking device to emit the tracking signal;
C. a receiving means comprising:
   a signal means for receiving the tracking signal;
   an interpretation means for interpreting the received tracking signal to identify the tracking chip and to indicate the location of the tracking chip, the target vehicle being tagged when the tracking device adheres to the target vehicle, the tracking signal emitted thereby being a representation of the location of the tagged target vehicle; and
D. a display means in communication with and receiving the interpreted tracking signal from the receiving means, the interpreted tracking signal being displayed as an image on the display means, the image representing the location of the tagged target vehicle.

15. The tagging system as described in claim 14, wherein the actuating means further includes an arming means for arming the tracking device and a firing means for firing the tracking device, the arming means causing the tracking device to emit the tracking signal while the tracking device is launched.

16. The tagging system as described in claim 14, further comprising a plurality of receiving means, the plurality of receiving means at locations remote from the launching device.

17. The tagging system as described in claim 15, further comprising a Global Positioning Satellite ("GPS") which receives the tracking signal emitted by the tracking device and reflects the tracking signal to the receiving means.

18. The tagging system as described in claim 15, further comprising a communications satellite which receives the tracking signal emitted by the tracking device and reflects the tracking signal to the receiving means.

19. The tagging system as described in claim 15, wherein the arming means, the firing means and the receiving device are contained within a pursuit vehicle.

20. The tagging system as described in claim 15, wherein the launching device further includes a laser sighting means attached to the housing and in communication with the arming means.

21. The tagging system as described in claim 14, wherein said retaining means includes a pair of retaining forks, each retaining fork having a pronged end and a second end, the retaining forks in communication with a solenoid at their second end, the pronged end engaging the launching means and retaining the launching means towards the housing rear end, until the actuating means is activated.

22. The tagging system as described in claim 14, wherein the housing further comprises a door, the door attached to the housing front end, the door preventing debris from entering the housing but opening when the launching means is activated and the tracking device is launched.

23. The tagging system as described in claim 14, wherein the housing is attached to a pursuit vehicle.

24. A system for tagging a target vehicle, the system comprising:
A. a tracking device comprising:
   1. a tracking chip having
      a microprocessor,
      a power source, and
      an emitting means for emitting a tracking signal, the tracking signal emitted being a unique representation of the tracking chip; and
   2. an attachment means for attaching the tracking chip to the target vehicle, the attachment means containing the tracking chip therein, such that when the attachment means attaches to the target vehicle, the tracking chip contained therein is not damaged;
B. a launching device having:
   a housing having a front end having an opening therethrough, and a rear end;
   a launching means for launching slidably retained within the housing;
   a connection means connecting the launching means to the housing rear end;
   a retaining means for retaining the launching means within the housing and proximate to the housing rear end and the connection means;
   the tracking device slidably retained within the housing but not adhering to the housing, and the tracking device in contact with the launching means but not adherent to the launching means;

an actuating means for actuating the launching means, which when activated causes the retaining means to be released, the tracking device to be launched towards the target vehicle and the tracking device to emit the tracking signal;

a heating means for heating the housing, the housing thereby maintaining a temperature adequate to maintain the attachment means in a pliable state;

C. a receiving means comprising:

a signal means for receiving the tracking signal;

an interpreting means for interpreting the received tracking signal to identify the tracking chip and to indicate the location of the tracking chip, the target vehicle being tagged when the tracking device adheres to the target vehicle, the tracking signal emitted thereby being a representation of the location of the tagged target vehicle; and D. a display means in communication with and receiving the interpreted tracking signal from the receiving means, the interpreted tracking signal being displayed as an image on the display means, the image representing the location of the tagged target vehicle.

25. The tagging system as described in claim 23, wherein the heating means is electric heat wrap tape, the electric heat wrap tape being wrapped around the housing and in communication with a power source.

26. The tagging system as described in claim 24, wherein the heating means comprises circulating warm liquid about the housing.

27. The tagging system as described in claim 23, wherein the launching device further includes a laser sighting means attached to the housing and in communication with the actuating means.

* * * * *

US006246323C1

(12) EX PARTE REEXAMINATION CERTIFICATE (9873rd)
United States Patent
Fischbach

(10) Number: US 6,246,323 C1
(45) Certificate Issued: Oct. 15, 2013

(54) METHOD AND SYSTEM FOR TRACKING A VEHICLE

(75) Inventor: Trevor A. Fischbach, Montclair, NJ (US)

(73) Assignee: SC Holdings, LLC, Virginia Beach, VA (US)

Reexamination Request:
No. 90/012,913, Jul. 11, 2013

Reexamination Certificate for:
Patent No.: 6,246,323
Issued: Jun. 12, 2001
Appl. No.: 09/040,974
Filed: Mar. 18, 1998

(51) Int. Cl.
*B60R 25/00* (2013.01)

(52) U.S. Cl.
USPC .............. 340/539.13; 340/572.8; 340/8.1; 340/989; 340/990; 340/357.75

(58) Field of Classification Search
None
See application file for complete search history.

(56) References Cited

To view the complete listing of prior art documents cited during the proceeding for Reexamination Control Number 90/012,913, please refer to the USPTO's public Patent Application Information Retrieval (PAIR) system under the Display References tab.

*Primary Examiner* — Jalatee Worjloh

(57) ABSTRACT

A tagging system for tagging a target vehicle consists of a tracking device, a launching device, a receiving device and a monitor to display the position of the target vehicle. The tracking device includes a tracking chip contained in a pliable carrier, and is stored in and launched from a housing mounted in a pursuit vehicle's grill. The launching device includes a firing pad slidably retained within the housing and spring mounted to the housing rear end. Pad forks in communication with a solenoid retain the firing pad near the housing rear end until two switches in the pursuit vehicle are sequentially activated, whereupon the tracking device emits a tracking signal, the solenoid is activated, releasing pad forks and thereby launching the tracking device towards the target vehicle. The tracking device is in free flight until it impacts ("tags") the surface of the fleeing vehicle, to which it adheres by means of the carrier. The tagged vehicle thus emits a tracking signal which represents the location of the tagged vehicle, which is received by the receiving device and appears as an image on a monitor within the pursuit vehicle. The system can work with a Global Positioning Satellite system or similar navigational or communications satellites. The need to maintain constant visual contact is reduced, and thereby the risk of injury to the public and parties involved in the hot pursuit of a fleeing vehicle.

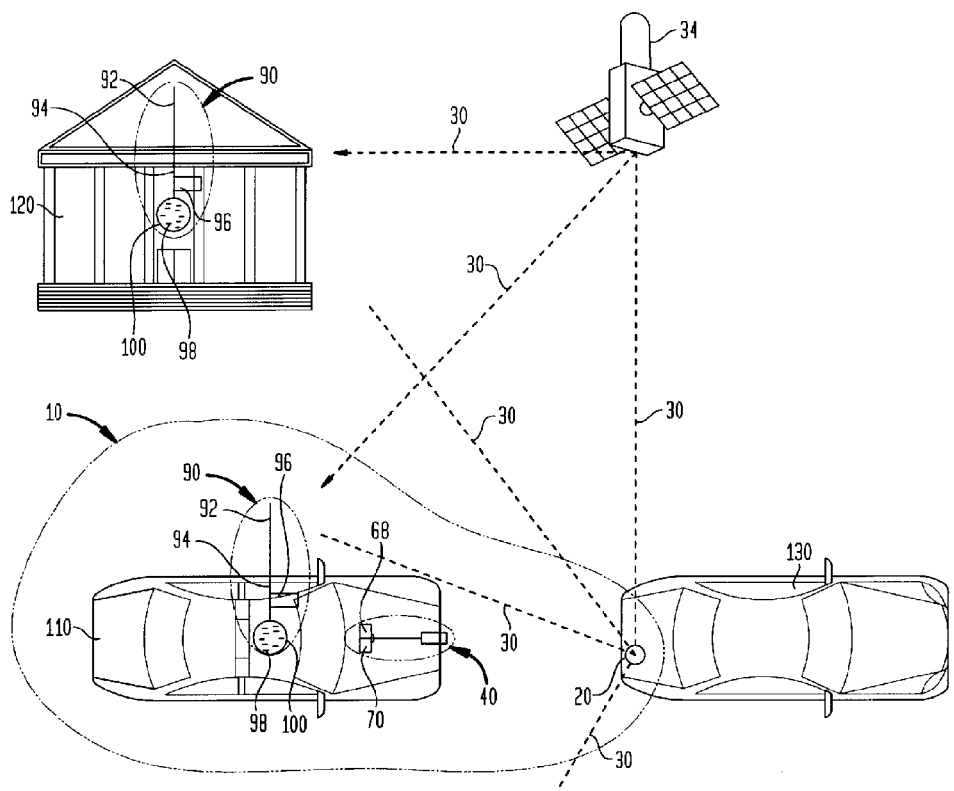

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-27 is confirmed.

\* \* \* \* \*